Patented May 11, 1948

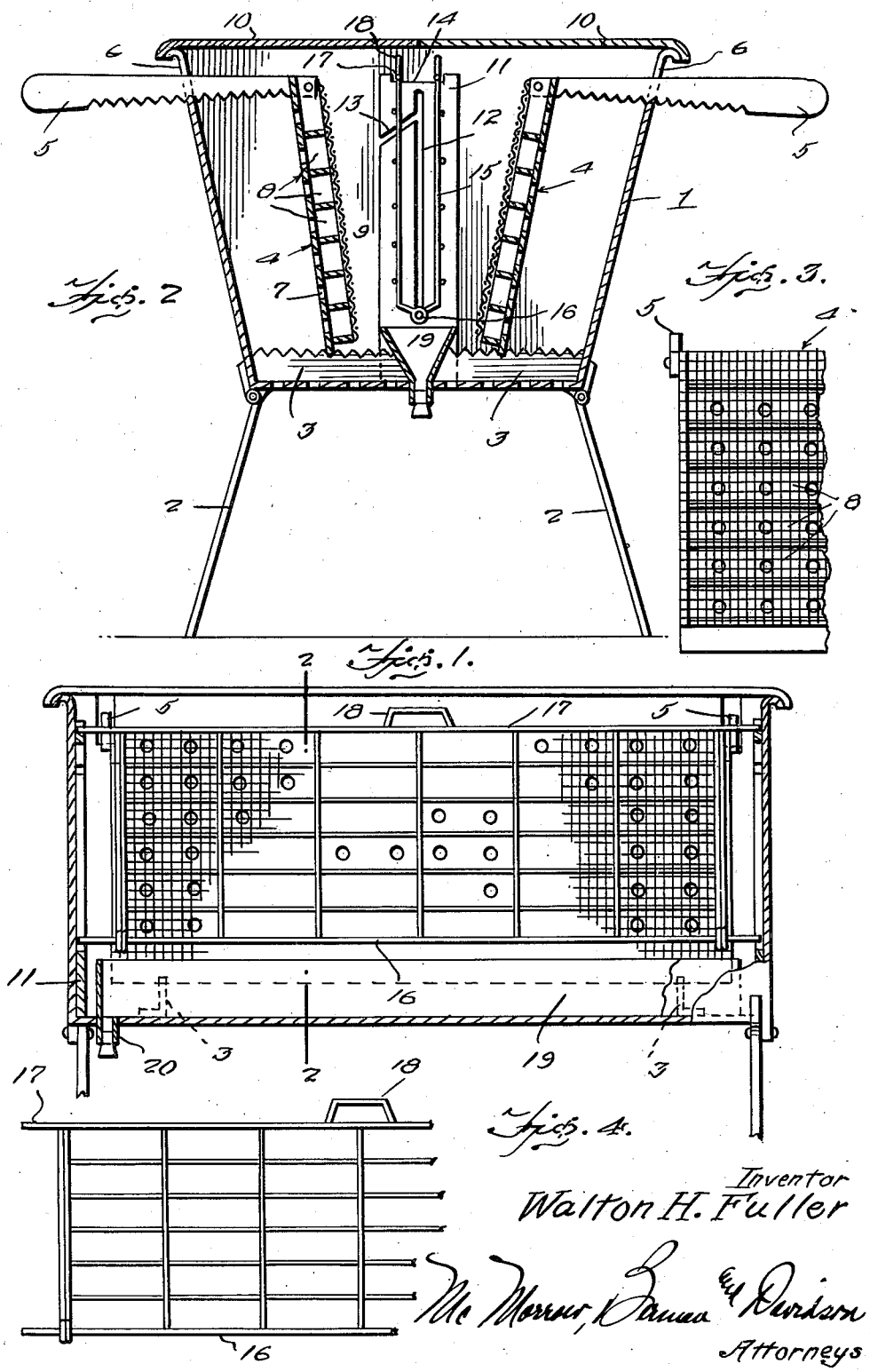

2,441,190

UNITED STATES PATENT OFFICE 2,441,190

BARBECUE SET

Walton H. Fuller, Graeagle, Calif.

Application June 12, 1945, Serial No. 598,943

9 Claims. (Cl. 126—25)

This invention relates to portable grills, and more particularly, to a portable grill for broiling meats, fish, fowl, and the like, in which the broiling surfaces are substantially vertically disposed.

A main object of the invention is to provide a novel and improved barbecue set for broiling meats and the like wherein the fats and juices of the food do not drip on the heat source whereby no deposits of soot occur on the food, and wherein a wide range of control is provided for applying heat to the food.

A further object of the invention is to provide an improved barbecue set of simple construction wherein heat may be applied to the broiling meats in an efficient and easily controlled manner and wherein a minimum of fuel is required.

Further objects and advantages of the invention will appear from the following description and claims, and from the accompanying drawings, wherein:

Figure 1 is a vertical cross-sectional view taken through the longitudinal central plane of a barbecue set constructed in accordance with this invention.

Figure 2 is a cross-sectional view taken on line 2—2 of Figure 1.

Figure 3 is an elevational view of the end portion of a grate member employed in the barbecue set of Figure 1.

Figure 4 is an elevational view of a portion of a grill member employed in the barbecue set of Figure 1.

Referring to the drawings, 1 designates a generally trough-shaped box of rectangular plan, said box being preferably made of sheet metal or other heat resistant material. The box is supported at its corners by leg members 2 which are adapted to be folded under the box when the set is not being used. The bottom wall of the box is perforated to allow air to enter for the combustion of the fuel.

Mounted on the bottom wall of the box adjacent the end walls thereof are traverse support members 3, 3, said support members comprising angle bars formed with serrated top edges. Supported at their bottom edges on the serrated transverse support members 3, 3 are a pair of grate members 4, 4, said grate members being each provided with a pair of handle members 5, 5 pivotally secured to the respective grate members at their upper corners and adapted to be rotated upwardly substantially into alignment with said grate members at times. Appropriate stop lugs may be provided to limit rotation of said handle members with respect to said grate members to such an aligned position so that the grate members may be conveniently carried by said handle members when it is desired to ignite or quench the fuel.

The lower edges of handle members 5, 5 are serrated and are adapted to cooperate with the bottom edges of appropriate notches 6 provided in the side walls of box 1 for maintaining the grates 4 in a desired adjusted position.

Each grate 4 comprises a perforated rear wall 7 and a plurality of longitudinal recesses 8 forming fuel receptacles, said fuel receptacles being adapted to be filled with charcoal or other suitable solid fuel. A wire screen 9 is provided over the open ends of the fuel receptacles to hold the fuel in position in the receptacles when the grates are in substantially vertical positions, as shown in Figure 2. The wire screen is detachably secured to the face of the grate, thereby enabling the screen to be removed from the grate for the filling of its fuel receptacles 8 with fuel. Preferably, the wire screen is detachably secured to the face of the grate by wire links at the bottom and by suitable catches or fasteners at the top. As the means for detachably securing the wire screen to the grate forms no part of the invention it is unnecessary to illustrate and describe the same.

The top of the box 1 is provided with a pair of cover sections 10, 10 laterally slidable from and toward one another, said cover sections being adapted to be positioned so that they substantially cover the space behind grates 4, 4 and function as baffles to substantially deflect air entering said space from below the box toward the perforated rear walls 7 of the grate members. Any air rising between the walls of the box 1 and rear walls 7 and failing to enter through the perforations therein is deflected by cover sections 10 toward the wire screen 9.

Mounted on the opposite end walls of box 1 in the central longitudinal plane thereof are a pair of vertical plate members 11, 11, each plate member being provided with a vertical slot 12 formed with a lateral outlet portion 13. The top of each plate member 11 is formed with a shallow rectangular recess 14.

Supported by the opposing plate members 11, 11 in the central longitudinal plane of box 1 is a grill member 15 of the folding type, said grill member comprising a bottom hinge bar 16 pivotally connecting a pair of side grills, the upper portions of said side grills being provided with projecting end bars 17 and central handles 18. Space is provided between the side grills for receiving pieces of beef, steaks, fish, and the like, and the top portions of said side grills may be locked together by appropriate securing means. Grill member 15 is held in vertical position in box 1 by the cooperation of the projecting ends of bottom hinge bar 16 with the lower portions of slots 12 and the reception of the projecting end bars 17 in the shallow rectangular recesses 14. Grill member 15 may readily be removed by lifting handles 18 with an appropriate utensil and guiding hinge bar 16 out of slot portions 13.

Positioned beneath grill member 15 in box 1 is a longitudinally extending trough 19 provided with a stoppered spout 20 at one end thereof. Trough 19 is adapted to catch the meat juices for removal through spout 20. Said juices may be employed for gravies, sauces or for basting the meat.

It is thus seen that a structure has been disclosed wherein both sides of the meat or steaks can be simultaneously broiled, resulting in a substantial saving in time. Furthermore a wide range of adjustment of the grates with respect to the grill member is possible, so that all steps required for the most effective broiling of the food may be followed in their proper sequence. The juices which are not sealed in drip down into trough 19 where they may be salvaged and do not drip onto live coals, thereby preventing flaring up of the coals and avoiding soot deposits on the food. Both the charcoal grates and the grill member are readily demountable. The charcoal may be thus easily quenched after barbecuing is completed whereby the charcoal may be saved for reuse.

In using the barbecue set, the fat and suet may be left on the meat to improve its flavor. During the broiling process the melted fat and surplus juices will drain into trough 19.

While the structure disclosed in the foregoing description employs charcoal as the fuel, a similar arrangement of heat sources with respect to the grill member may be employed using gas burners, electric burners, or other suitable heat sources, the relative functions being the same.

While a specific embodiment of a portable grill has been disclosed in the foregoing description, it will be understood that various modifications within the spirit of the invention may occur to those skilled in the art. Therefore it is intended that no limitations be placed on the invention other than as defined by the scope of the appended claims.

What is claimed is:

1. A grill structure comprising a container, notched means near the bottom of said container, a substantially vertical grate in said container provided with fuel receptacle means distributed over its surface and adapted at its lower end for selective support in one of said notches, means for adjusting the angle of said grate in the container and lifting said grate from the notched means and adjustably related to the container, and a vertical grill member supported in said container adjacent said grate.

2. The structure of claim 1, and wherein a trough is provided under said grill member, said trough being formed with a spout adjacent one end thereof.

3. The structure of claim 1, and wherein said grate is provided with a handle member projecting laterally thereof and formed with means cooperating with a wall of the container to secure the grate in a desired angle of adjustment in the container.

4. A portable grill structure comprising a container, notched means near the bottom of said container, a pair of substantially vertical grates in said container, each grate being provided with fuel receptacle means distributed over its surface and adapted at its lower end for selective support in one of the notches, means for lifting said grates from the notched means and for adjusting the angular positions of said grates in the container and a removable vertical grill member supported in said container between said grates.

5. The structure of claim 4, and wherein a trough is provided under said grill member, said trough being longitudinally aligned with said grill member and being provided adjacent one end thereof with a stoppered spout.

6. The structure of claim 4, and wherein said fuel receptacle means comprises longitudinal recesses having perforated rear walls and being covered by wire mesh at its forward portion.

7. A grill structure comprising a container having opposite side walls and an apertured bottom, each of said side-walls being provided with a slot, notched means in said container and near the bottom thereof, a pair of substantially vertical grates in said container and each adapted for selective support in one of said notches, levers each extending through the slot in the container side wall and pivoted at its inner end to one of the grates and having notches on its lower side for selective engagement with said container side wall, and a removable vertical grill member supported in said container between said grates.

8. A portable grill structure comprising a container, support members in said container, a pair of substantially vertical grates in said container and each adapted to rest upon one of said support members, each grate being provided with fuel receptacle means distributed over its surface, means for lifting said grates from said support members and adjusting the angular positions of said grates in the container, means each extending vertically on the inner side of one of the opposite container walls and having a longitudinal vertical guide and a transverse guide connecting with said first guide, and a removable vertical grill member coacting with said guides.

9. A portable grill structure comprising a container, support members in said container, a pair of substantially vertical grates in said container and each adapted to rest upon one of said support members, each grate being provided with fuel receptacle means distributed over its surface, means for lifting said grates from said support members and adjusting the angular positions of said grates in the container, means each extending veritcally on the inner side of one of the opposite container walls and having a longitudinal vertical guide and a transverse guide connecting with said first guide and also having a holding means or notch in the top thereof, and a removable vertical grill member coacting with said guides and comprising hinged parts held together by the second means in one position and releasable therefrom in another position to be swung apart.

WALTON H. FULLER.

REFERENCES CITED

The following references are of record in the file of this patent:

UNITED STATES PATENTS

| Number | Name | Date |
| --- | --- | --- |
| 47,176 | Wetmore | Apr. 4, 1865 |
| 2,101,180 | Jacobs | Dec. 7, 1937 |
| 2,314,772 | Corra | Mar. 23, 1943 |

FOREIGN PATENTS

| Number | Country | Date |
| --- | --- | --- |
| 4,388 | Great Britain | Sept. 2, 1909 |